Figure 1:
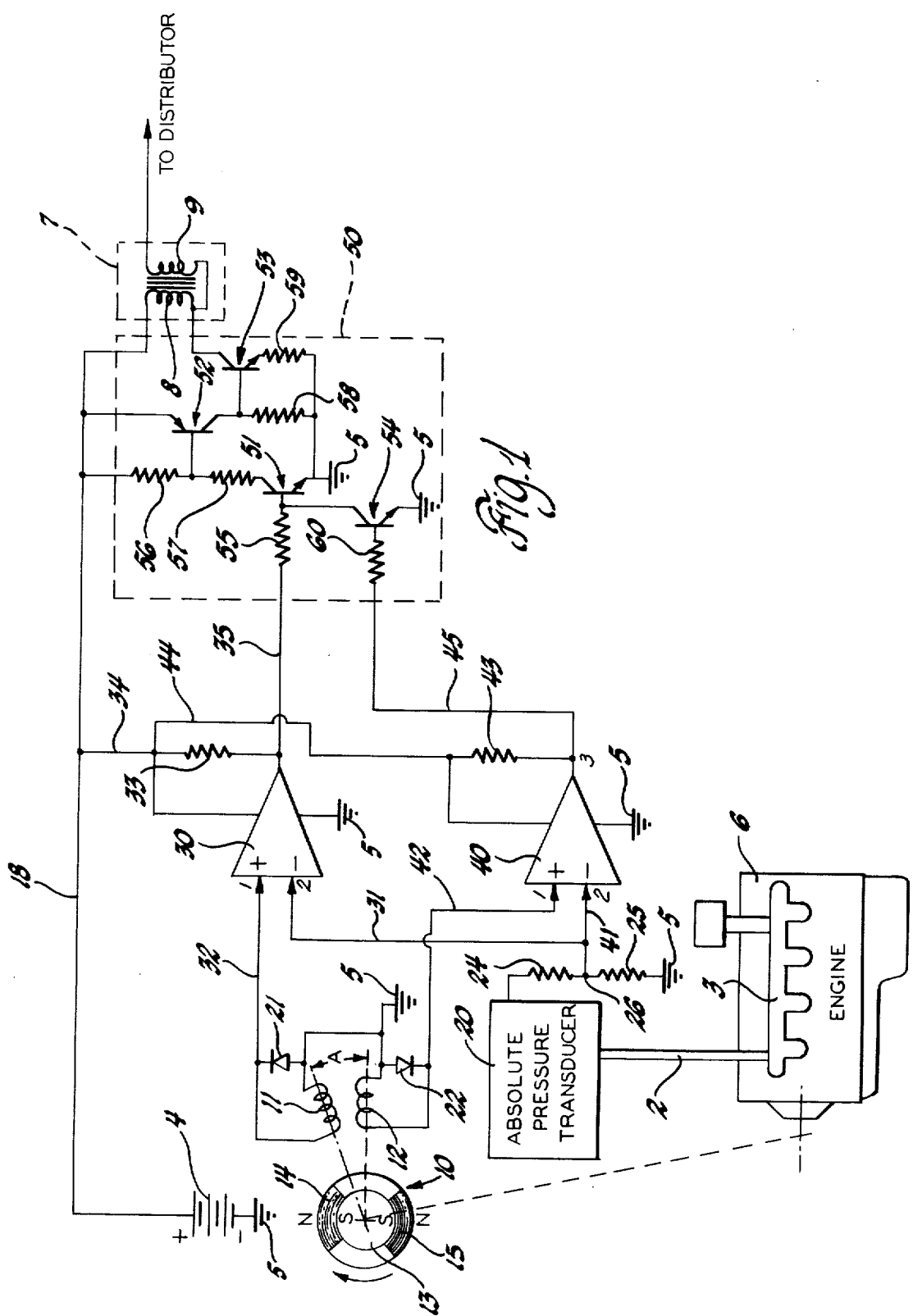

United States Patent [19]

Gambill

[11] 3,972,310

[45] Aug. 3, 1976

[54] ELECTRONIC INTERNAL COMBUSTION ENGINE IGNITION SPARK VACUUM AND SPEED ADVANCE SYSTEM

[75] Inventor: Charles C. Gambill, Kokomo, Ind.

[73] Assignee: General Motors Corporation, Detroit, Mich.

[22] Filed: Aug. 16, 1974

[21] Appl. No.: 497,901

[52] U.S. Cl. .................... 123/117 R; 123/146.5 A; 123/148 E
[51] Int. Cl.² .......................................... F02P 5/04
[58] Field of Search .... 123/32 EA, 117 R, 148 MC, 123/148 E, 146.5 A, 148 IC

[56] References Cited
UNITED STATES PATENTS

| | | | |
|---|---|---|---|
| 3,219,878 | 11/1965 | Konopa | 123/148 E |
| 3,630,185 | 12/1971 | Struber et al. | 123/148 MC |
| 3,794,003 | 2/1974 | Reddy | 123/32 EA |
| 3,797,465 | 3/1974 | Hobo et al. | 123/32 EA |
| 3,809,029 | 5/1974 | Wakamatsu et al. | 123/32 EA |
| 3,822,679 | 7/1974 | Hobo et al. | 123/32 EA |
| 3,824,967 | 7/1974 | Gordon | 123/32 EA |
| 3,824,977 | 7/1974 | Campbell | 123/148 E |
| 3,832,981 | 9/1974 | Wakamatsu et al. | 123/32 EA |
| 3,834,362 | 9/1974 | Takeshita et al. | 123/32 EA |
| 3,851,469 | 12/1974 | Eichler et al. | 123/117 R |

Primary Examiner—Charles J. Myhre
Assistant Examiner—Paul Devinsky
Attorney, Agent, or Firm—Richard G. Stahr

[57] ABSTRACT

Two series of phase displaced leading and trailing electrical signal wave forms of a potential level proportional to engine speed are generated in timed relationship with the engine and an absolute pressure transducer produces an engine manifold absolute pressure electrical signal of a potential level proportional to engine manifold absolute pressure. The engine manifold absolute pressure signal and the leading and trailing electrical wave form series are compared by respective comparator circuits. While the potential level of each of the leading electrical signal wave forms is equal to or greater than that of the engine manifold absolute pressure signal, the corresponding comparator circuit produces an output ignition dwell signal and when the potential level of each of the trailing electrical signal wave forms has increased to that of the engine manifold absolute pressure signal, the corresponding comparator circuit produces an output ignition signal. An electronic ignition circuit is responsive to each of the ignition dwell signals for completing and to each of the ignition signals for interrupting, respectively, an energizing circuit for the primary winding of an associated ignition coil.

4 Claims, 5 Drawing Figures

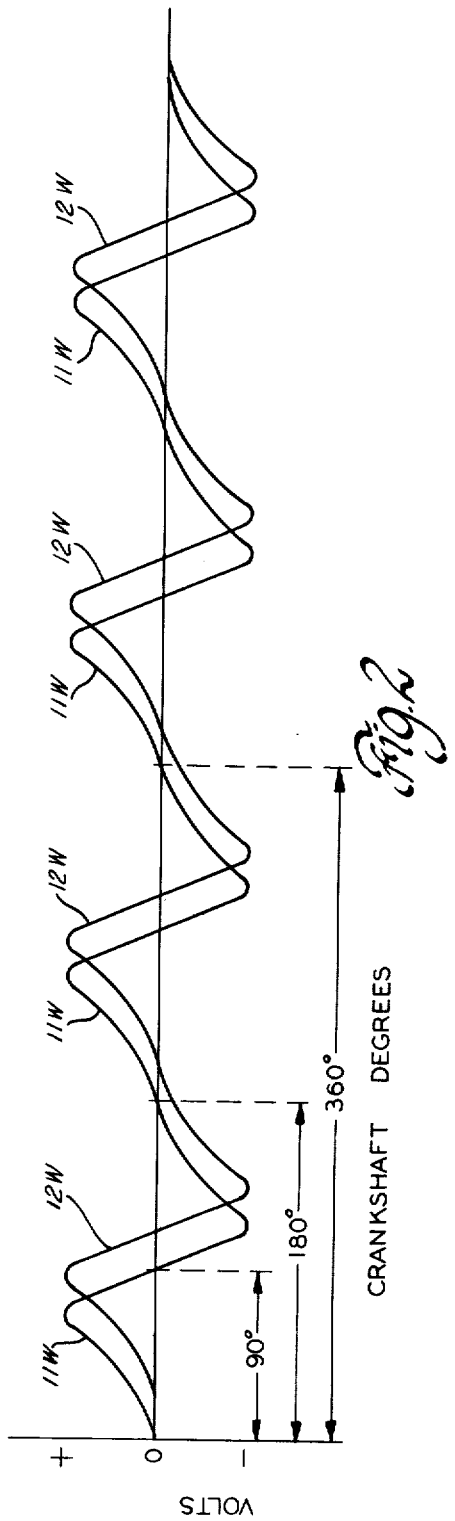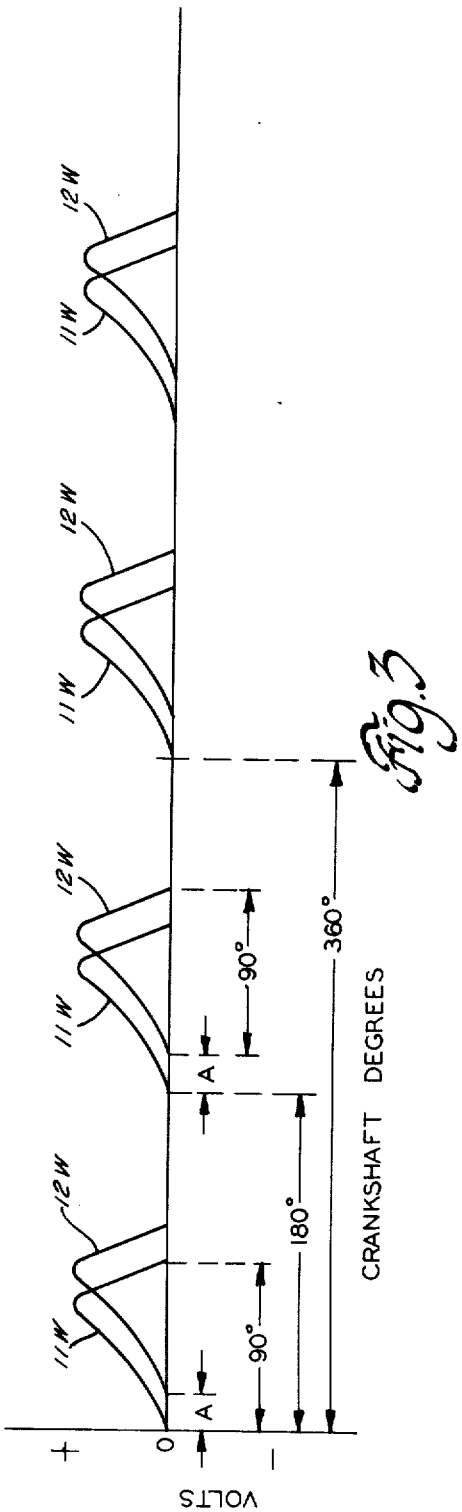

ELECTRONIC INTERNAL COMBUSTION ENGINE IGNITION SPARK VACUUM AND SPEED ADVANCE SYSTEM

This invention is directed to an improved internal combustion engine ignition spark manifold absolute presssure and speed advance system and, more specifically, to an improved system for providing internal combustion engine ignition spark manifold absolute pressure and speed advance electronically.

In prior art internal combustion engine ignition systems, the ignition spark vacuum advance is produced by a vacuum motor, in communication with a port in the engine intake manifold, which revolves the ignition distributor breaker plate in a direction to advance ignition spark timing as the intake manifold vacuum became greater and the ignition spark speed advance is produced by weights rotated by the ignition distributor shaft which are mechanically linked with the ignition distributor breaker plate to revolve the breaker plate in a direction to increase ignition spark advance with increases of engine speed and vice versa. The prior ignition systems, therefore, are subjected to errors in that the mechanical linkage of all mass produced ignition spark vacuum and speed advance systems can not be manufactured indentical to each other and the problem of wear over a period of time that the engine is operated introduces errors into both the vacuum and speed advance linkages. Furthermore, the vacuum advance is responsive to intake manifold vacuum, consequently, the ignition spark vacuum advance is considerably different between sea level atmospheric pressures and atmospheric pressures at higher altitudes. Therefore, a system which provides internal combustion engine ignition spark manifold absolute pressure and speed advance electronically to eliminate the undersirable features of the prior art systems, is desirable.

It is, therefore, an object of this invention to provide an improved internal combustion engine ignition spark manifold absolute pressure and speed advance system.

It is another object of this invention to provide an improved internal combustion engine ignition spark manifold absolute pressure and speed advance systems wherein the manifold absolute pressure and speed advance is produced electronically in response to electrical signals proportional to engine manifold absolute pressure and engine speed.

In accordance with this invention, an improved electronic internal combustion engine ignition spark manifold absolute pressure and speed advance system is provided wherein separate comparator circuits produce, respectively, an output ignition dwell signal when the potential level of each of a series of leading potential wave forms, produced in timed relationship with the engine, is of a magnitude greater than an engine manifold absolute pressue signal produced by an absolute pressure transducer and an output ignition signal when the potential level of each of a series of trailing potential wave forms, produced in timed relationship with the engine and phase displaced from the leading signal wave forms, rises to that of the engine manifold absolute pressure signal and an electronic ignition circuit is responsive to the dwell and ignition signals for completing and interrupting, respectively, an energizing circuit for the primary winding of an associated igniton coil.

For a better understanding of the present invention, together with additonal objects, advantages and features thereof, reference is made to the following description and accompanying drawing in which:

FIG. 1 is a schematic diagram of the electronic internal combustion engine ignition spark manifold absolute pressure and speed advance system of this invention; and FIGS. 2, 3, 4a and 4b are respective sets of curves useful in understanding the operation of the circuit of FIG. 1.

As point of reference or ground potential is the same point electrically throughout the system, it has been representated in FIG. 1 by the accepted schematic symbol and referenced by the numeral 5.

Referring to FIG. 1, the electronic internal combustion engine ignition spark manifold absolute pressure and speed advance system of this invention is set forth in schematic form in combination with an internal combustion engine 6 and an ignition coil 7 having a primary winding 8 and a secondary winding 9. The electrical operating potential may be supplied by a conventional storage battery 4 or any other direct current potential source well known in the art.

To produce, in timed relationship with engine 6, two series of phase displaced leading and trailing electrical signal wave forms of a potential level proportional to engine speed, a magnetic pickup arrangement, generally shown at 10, is provided. Electrical pickup arrangement 10 includes two pickup coils 11 and 12, a rotating member 13 and two permanent magnets 14 and 15 mounted upon and rotated with rotating member 13. Rotating member 13 is rotated by engine 6 and may be a drum mounted upon the engine crankshaft, or it may be mounted upon the engine flywheel, or it may be mounted upon the engine dynamic balancer or any other vehicle part which is rotated at a speed equal to or proportional to vehicle engine speed. It is only necessary that the permanent magnets 14 and 15, mounted upon and rotated with rotating member 13, be passed in close enough proximity to pickup coils 11 and 12 that the magnetic flux produced by magnets 14 and 15 link pickup coils 11 and 12 in a manner well known in the magnetic pickup art. Without intention or inference of a limitation thereto, it will be assumed for purposes of this specification that internal combustion engine 6 rotates rotating member 13 in a clockwise direction, as viewing FIG. 1, that permanent magnets 14 and 15 are mounted 180 mechanical degrees apart and are magnetized in a radial direction with the north poles thereof facing outwardly from the center of rotating member 13. It is to be specifically understood that permanent magnets 14 and 15 may be radially magnetized in the oposite direction and that rotating member 13 may be rotated in a counterclockwise direction without departing from the spirit of the invention. To provide a phase displacement between the series of leading electrical signal wave forms induced in pickup coil 11 and the series of trailing electrical signal wave forms induced in pickup coil 12 as rotating member 13 is rotated in a clockwise direction, pickup coils 11 and 12 may be displaced from each other by a predetermined number of mechanical degrees. For purposes of this specification and without intention or inference of a limitation thereto, it will be assumed that pickup coils 11 and 12 are displaced from each other twenty engine crankshaft degrees, as indicated by angle A in FIG. 1. With this arrangement, each of the leading electrical signal wave forms of the series induced in pickup coil 11 is phase displaced from and lead each of the corresponding trailing electrical signal wave forms of the series induced in pickup coil 12 by twenty engine crankshaft degrees. Should rotating member 13 be rotated by engine 6 in a counterclockwise direction, the series of leading electrical signal wave forms would be induced in pickup coil 12 and the series of trailing electrical signal wave forms would be induced in pickup coil 11. With rotating permanent magnets 14 and 15 passing by and in magnetic linking arrangement with pickup coils 11 and 12, the output electrical signal wave form from each coil would be of the form illustrated in FIG. 2 wherein the output electrical signal wave form of pickup coil 11 is identified by the reference numeral 11W and the output electrical signal wave form of pickup coil 12 is identified by the reference numeral 12W. By placing diodes 21 and 22 across respective pickup coils 11 and 12, the output of pickup coil 11 will be a series of leading electrical signal wave forms and the output of pickup coil 12 will be a series of phase displaced trailing electrical signal wave forms separated by a number of engine crankshaft degrees equal to angle A, as illustrated in FIG. 3. The electrical signal wave forms induced in pickup coils 11 and 12 are of an electrical potential proportional to engine speed and coils 11 and 12 are matched to provide output electrical signal wave forms of substantially equal potential level. That is, as the speed of engine 6 increases, the amplitude of the electrical signal wave forms induced in pickup coils 11 and 12 increase and will be of substantially equal amplitude at any engine speed. The actual number of engine crankshaft degrees represented by each of the electrical signal wave forms is determined by the geometry of the magnets and pickup coils in a manner well known in the magnetic pickup art. For purposes of this specification and without intention or inference of a limitation thereto, it will be assumed that each of the electrical signal wave forms extends over ninety engine crankshaft degrees.

The magnetic pickup arrangement illustrated in FIG. 1, with permanent magnets 14 and 15 mounted 180 degrees apart upon rotating member 13, may be used with four cylinder engines. With this arrangement, the ignition spark advance will be adjusted every 180° of crankshaft rotation.

To produce an engine manifold absolute pressure electrical signal of a potential level proportional to engine manifold absolute pressure, an absolute pressure transducer 20 having the input port thereof exposed to engine intake manifold pressure may be employed. One example of an absolute pressure transducer suitable for use with this application is marketed by the National Semiconductor Corporation and is identified as Type LX1603A. This pressure transducer produces an electrical output signal which is of a potential level proportional to absolute pressure and increase linearly with increases of absolute pressure. In FIG. 1, absolute pressure transducer 20 is indicated in block form and is illustrated as having the intake port thereof in communication with engine intake manifold 3 through line 2. Therefore, as the absolute pressure of the intake manifold 3 of internal combustion engine 6 increases, absolute pressure transducer 20 produces an output electrical signal which increases linearly therewith and is applied across series resistors 24 and 25 connected across the output terminal thereof and point of reference or ground potential 5.

Junction 26 between series resistors 24 and 25 is connected to the minus input terminal 2 of respective potential comparator circuits 30 and 40 through respective leads 31 and 41. consequently, resistors 24 and 25 are so proportioned that, at maximum absolute pressure, the potential appearing across junction 26 and point of reference or ground potential 5 is of a magnitude compatible with the maximum input signal which comparator circuits 30 and 40 will tolerate. The series of phase displaced leading electrical signal wave forms produced by pickup coil 11 is applied to the plus input terminal 1 of potential comparator circuit 30 through lead 32 and the series of trailing electrical signal wave forms produced by pickup coil 12 are applied to the plus input terminal 1 of potential comparator circuit 40 through lead 42. Comparator circuits 30 and 40 may be any one of the many comparator circuits well known in the art. One example of a commercially available comparator circuit suitable for use with this application is marketed by National Semiconductor Corporation and is identified as Type LM2901. In comparator circuits of this type, output terminal 3 is the uncommitted collector electrode of the output NPN transistor. consequently, output terminal 3 of each of comparator circuits 30 and 40 is connected to the positive polarity terminal of battery 4 through respective pull-up resistors 33 and 43 and respective leads 34 and 44 and positive potential bus 18. With comparator circuits of this type, while the potential level upon the plus input terminal 1 is more positive than the potential level upon the minus input terminal 2, a positive polarity signal is present upon output terminal 3 and while the potential level upon minus input terminal 2 is more positive than the potential level upon plus input terminal 1, output terminal 3 is near ground potential.

Potential comparator circuit 30 is responsive to the leading electrical signal wave forms produced by pickup coil 1 and the engine manifold absolute pressure signal produced by absolute pressure transducer 20 for producing an ignition dwell signal while the potential level of each of the leading electrical signal wave forms is equal to or greater than that of the engine manifold absolute pressure signal. That is, while the leading electrical signal wave form, applied to plus input terminal 1 of potential comparator circuit 30, is more positive than that of the engine manifold absolute pressure signal, applied to minus input terminal 2, the output of potential comparator circuit 30 is of a positive polarity and of a magnitude sufficient to produce base driven current through type NPN transistor 51 of an electronic ignition circuit 50. The circuit through which base drive current is supplied to NPN transistor 51 may be traced from the positive polarity terminal of battery 4, through positive polarity bus 18, lead 34, pull-up resistor 33, lead 35, current limiting resistor 55, the base-emitter electrodes of NPN transistor 51 and point of reference or ground potential 5 to the negative polarity terminal of battery 4. while base drive current is supplied to NPN transistor 51, while the potential level of the leading electrical signal wave form produced by pickup coil 11 is equal to or greater than that of the engine manifold absolute pressure signal, transistor 51 conducts through the collector-emitted electrodes thereof. As the base electrode of PNP transistor 52 is connected to the junction between series resistor 56 and 57, while transistor 51 is conductive through the collector-emitted electrodes, a circuit is established through which emitter-base current is supplied to transistor 52. This circuit may be traced from the positive polarity terminal of battery 4, through positive potential bus 18, the emitter-base electrodes of transistor 52, resistor 57, the collector-emitter electrodes of transistor 51 and point of reference or ground potential 5 to the negative polarity terminal of battery 4. While this circuit is established, transistor 52 conducts through the emitter-collector electrodes thereof to produce a potential drop across collector resistor 58. The potential drop across resistor 58 is of a sufficient magnitude to produce base-emitter drive current through NPN switching transistor 53, the base electrode of which is connected to the junction between the collector electrode of transistor 52 and resistor 58. The circuit through which base drive current is supplied to switching transistor 53 may be traced from the positive polarity terminal of battery 4, through positive polarity bus 18, the emitter-collector electrodes of transistor 52, the base-emitter base electrodes of switching transistor 53, emitter resistor 59, and point of reference or ground potential 5 to the negative polarity terminal of battery 4. While base-emitter drive current is being supplied to switching transistor 53, this device conducts through the collector-emitter electrodes thereof to establish an energizing circuit for primary winding 8 of ignition coil 7 which may be traced from the positive polarity terminal of battery 4, through positive polarity bus 18, primary winding 8 of ignition coil 7, the collector-emitter electrodes of switching transistor 53, resistor 59 and point of reference or ground potential 5 to the negative polarity terminal of battery 4. From this description, it is apparent that the positive polarity ignition dwell signal produced by potential comparator circuit 30 initiates the action of electronic ignition circuit 50 to establish the energizing circuit for primary winding 8 of ignition coil 7.

Potential comparator circuit 40 is responsive to the trailing electrical signal wave forms produced by pickup coil 12 and the engine manifold absolute pressure signal produced by absolute pressure transducer 20 for producing an ignition signal when the potential level of the trailing electrical wave forms has increased to that of the engine manifold absolute pressure signal. While the potential of the trailing electrical wave forms is of a level less positive than of the engine manifold absolute pressure signal, the output of comparator circuit 40 is near ground potential. When the potential of the trailing electrical signal wave form has increased to a positive potential level equal to that of the engine manifold absolute pressure signal, potential comparator circuit 40 produces an ignition signal upon output terminal 3 thereof which is of a positive polarity and of a magnitude sufficient to produce base-emitter drive current through NPN transistor 54 of electronic ignition circuit 50. The circuit through which base drive current is supplied to transistor 54 may be traced from the positive polarity terminal of battery 4, through positive polarity bus 18, lead 44, pull-up resistor 43, lead 45, current limiting resistor 60, the base-emitter electrodes of NPN transistor 54 and point of reference or ground potential 5 to the negative polarity terminal of battery 4. This base drive current produces collector-emitter conduction through NPN transistor 54 to drain base drive current from NPN transistor 51, a condition which extinguishes transistor 51. With transistor 51 extinguishes, the circuit previously described, through which emitter-base drive current is supplied to transistor 52 is interrupted, consequently, transistor 52 extinquishes. With transistor 52 extinquished, the circuit, previously described, through base drive current is supplied to switching transistor 53 is interrupted, consequently, transistor 53 extinguishes to abruptly interrupt the energizing circuit of primary winding 8 of ignition coil 7. The resulting collapsing magnetic field induces an ignition potential in secondary winding 9 in a manner well known in the ignition art. The high ignition potential induced in secondary winding 9 is directed to the associated ignition distributor which further directs this potential to the spark plugs of the engine in the proper sequence as is well known in the automative art. From this description, it is apparent that the positive polarity ignition signal produced by potential comparator circuit 40 initiates the action of electronic ignition circuit 50 to abruptly interrupt the energizing circuit for primary winding 8 of ignition coil 7.

Figure 4A:
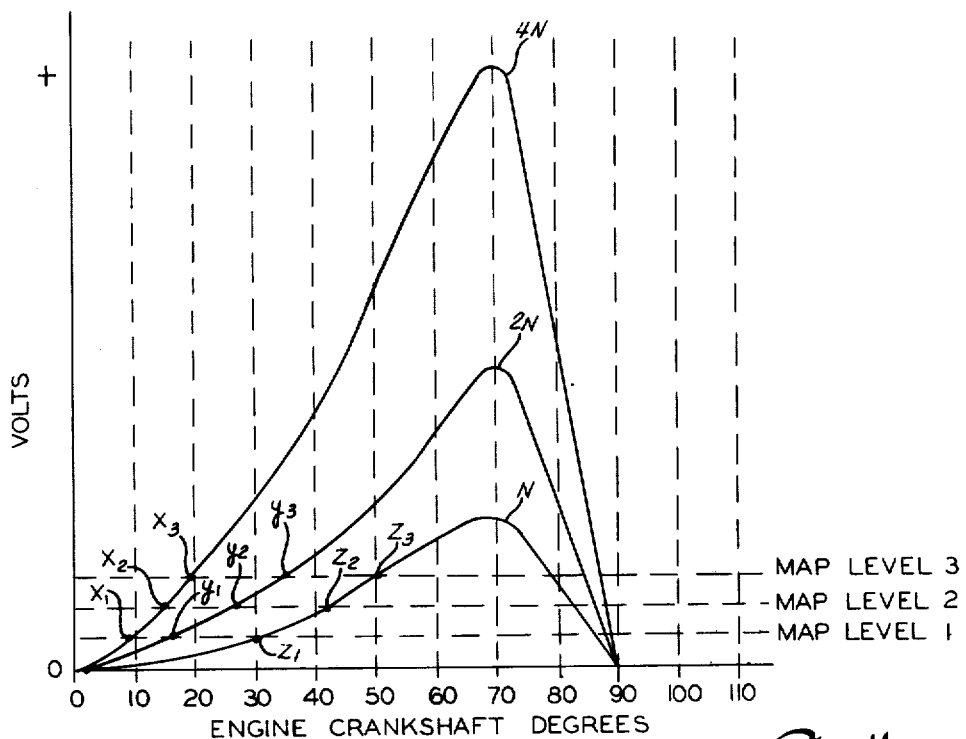
Figure 4B:
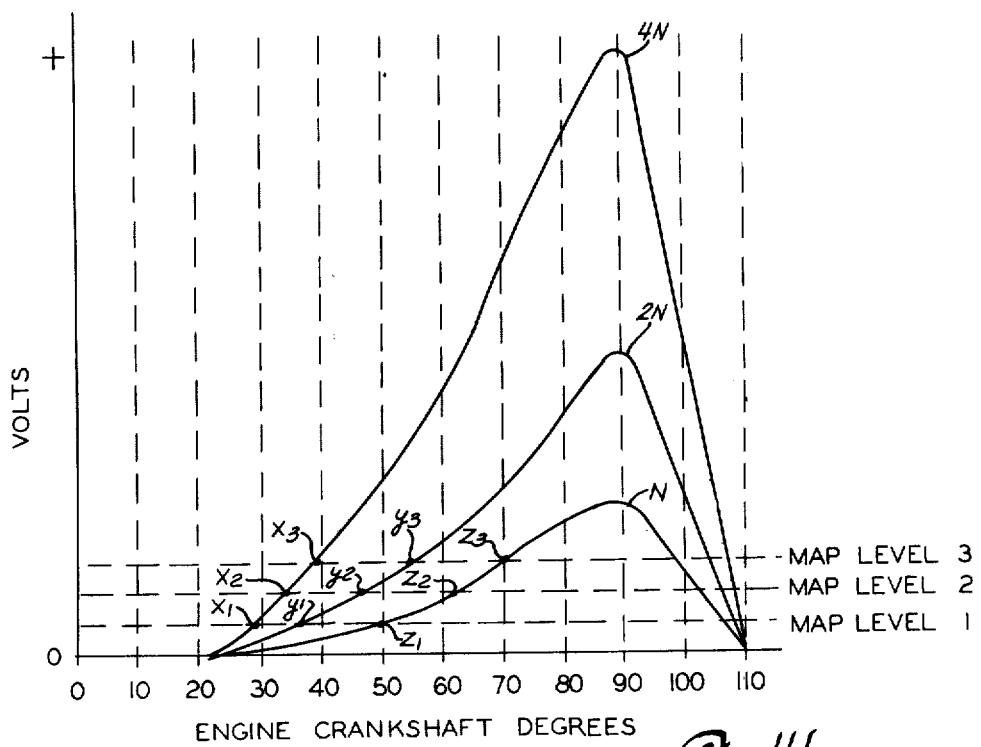

In FIG. 4A, one leading electrical signal wave form produced by pickup coil 11 is shown for each of engine speeds N, 2N, and 4N and in FIG. 4B, one trailing electrical signal wave form produced by pickup coil 12 is illustrated for each of engine speeds N, 2N and 4N. It may be noted that the curves of FIG. 4A lead the curves of FIG. 4B by twenty engine crankshaft degrees as pickup coils 11 and 12 are displaced from each other by twenty engine crankshaft degrees, angle A of FIG. 1. In each of FIG. 4A and 4B, three different levels of engine manifold absolute pressure electrical signals produced by absolute pressure electrical signals produced by absolute pressure transducer 20 are indicated and are identified by horizontal dashed lines labeled MAP level 1, MAP level 2 and MAP level 3. In FIGS. 4A and 4B, it will be assumed that MAP level 3 corresponds to the manifold absolute pressure at which the manifold absolute pressure spark advance is to be minimum and that MAP level 1 corresponds to the manifold absolute pressure at which the manifold absolute pressure spark advance is to be maximum. Voltage clamping circuitry may be employed to modify the output signal of absolute pressure transducer 20 to prevent the resulant signal from being less than MAP level 1 or greater than MAP level 3.

The leading and trailing electrical signal wave forms are coordinated with the piston of the reference cylinder of engine 6 in such a manner that, at the lowest engine speed and highest manifold absolute pressure, the potential level of the trailing electrical signal wave form rises to MAP level 3 at the number of engine crankshaft degrees of initial ignition spark advance required by engine 6, for example five degrees of initial spark advance. The magnetic pickup arrangement 10, therefore, is adjusted relative to the piston of the reference engine cylinder in such a manner that the potential level of the leading electrical signal wave form produced by pickup coil 11 at the lowest engine speed N reaches the MAP level 3 engine manifold absolute pressure signal potential level, point Z3 of FIG. 4A, twenty-five engine crankshaft degrees before the top dead center position of the piston of the reference cylinder so that twenty engine crankshaft degrees later or at five engine crankshaft degrees before the top dead center position of the piston of the reference cylinder, the potential level of the trailing electrical signal wave form will have risen to that of the engine manifold absolute pressure signal level of MAP level 3, point Z3 of FIG. 4B.

For purpose of illustration, it will be assumed that engine 6 is operating at a speed of 2N and a manifold absolute pressure at which absolute pressure transducer 20 products an engine manifold absolute pressure signal of a level equal to MAP level 3 of FIGS. 4A and 4B. When the potential of the leading electrical signal wave form produced by pickup coil 11, curve 2N of FIG. 4A, has increased to a potential level equal to Map level 3, point Y3 of FIG. 4A, and while it is of a potential level greater than the engine manifold absolute pressure signal, comparator circuit 30 produces an output ignition dwell signal which initiates the operation of electronic ignition circuit 50 to complete the energizing circuit for primary winding 8 of ignition coil 7 in a manner previously explained. That is, the ignition dwell signal initiates the ignition dwell time period, the period of time during which primary winding 8 is energized. Twenty engine crankshaft degrees later when the potential of the trailing electrical signal wave form produced by pickup coil 12, curve 2N of FIG. 4B, has increased to a potential level equal to MAP level 3, point Y3 of FIG. 4B, comparator circuit 40 produces an output ignition signal which initiates the operation of electronic ignition circuit 50 to interrupt the energizing circuit for primary winding 8 of ignition coil 7 in a manner previously explained. From this description, it is apparent that the ignition dwell time is initiated when and maintained while the leading electrical signal wave form potential level is equal to and greater than the manifold absolute pressure signal and the ignition spark is initiated twenty engine crankshaft degrees later when the trailing electrical signal wave form potential level has risen to a value equal to the manifold absolute pressure signal. Should the manifold absolute pressure decrease from MAP level 3 to MAP level 2 at an engine speed of 2N, the leading and trailing electrical signal wave forms would increase to a potential level equal to MAP level 2 at point Y2 of both FIGS. 4A and 4B. Referring to these FIGURES, the ignition dwell and spark would be advanced nine engine crankshaft degrees, the number of engine crankshaft degrees between points Y3 and Y2. Should the engine speed increase from 2N to 4N at MAP level 3, the leading and trailing electrical signal wave forms would increase to a potential level equal to MAP level 3 at points X3 of both FIGS. 4A and 4B, a condition which would provide sixteen engine crankshaft degrees of ignition dwell and spark advance, the number of engine crankshaft degrees between points Y3 and X3.

Referring to FIGS. 4A and 4B, with a decreasing manifold absolute pressure, at engine speed N, ignition dwell and ignition spark are advanced nine engine crankshaft degrees between MAP level 3 and MAP level 2, the number of engine crankshaft degrees between points Z3 and Z2, and eleven more engine crankshaft degrees between MAP level 2 and MAP level 1, the number of engine crankshaft degrees between points Z2 and Z1; at engine speed 2N, ignition dwell and ignition spark are advanced eight engine crankshaft degrees between MAP level 3 and MAP level 2, the number of engine crankshaft degrees between points Y3 and Y2, and ten more engine crankshaft degrees between MAP level 2 and MAP level 1, the number of engine crankshaft degrees between points Y2 and Y1, and at engine speed 4N, ignition dwell and ignition spark are advanced five engine crankshaft degrees between MAP level 3 and MAP level 2, the number of engine crankshaft degrees between points X3 and X2, and six more engine crankshaft degrees between MAP level 2 and MAP level 1, the number of engine crankshaft degrees between points X2 and X1. Conversely, with an increasing manifold absolute pressure, at engine speed N, ignition dwell and ignition spark advance are reduced eleven engine crankshaft degrees between MAP level 1 and MAP level 2, respective points Z1 and Z2, and nine more engine crankshaft degrees between MAP level 2 and MAP level 3, respective points Z2 and Z3; at engine speed 2N, ignition dwell and ignition spark advance are reduced ten engine crankshaft degrees between MAP level 1 and MAP level 2, respective points Y1 and Y2, and eight more engine crankshaft degrees between MAP level 2 and MAP level 3, respective points Y2 and Y3 and at engine speed 4N, ignition dwell and ignition spark advance are reduced six engine crankshaft degrees between MAP level 1 and MAP level 2, respective points X1 and X2, and five more engine crankshaft degrees between MAP level 2 and MAP level 3, respective points X2 and X3.

Referring again to FIGS. 4A and 4B, within an increasing engine speed, at MAP level 3, ignition dwell and ignition spark are advanced fifteen engine crankshaft degrees between engine speeds N and 2N, the number of engine crankshaft degrees between points Z3 and Y3, and sixteen more engine crankshaft degrees between engine speeds 2N and 4N, the number of engine crankshaft degrees between points Y3 and X3; at MAP level 2, ignition dwell and ignition spark are advanced fifteen engine crankshaft degrees between engine speeds N and 2N, the number of engine crankshaft degrees between points Z2 and Y2, and twelve more engine crankshaft degrees between engine speeds 2N and 4N, the number of engine crankshaft degrees between points Y2 and X2 and at MAP level 1, ignition dwell and ignition spark are advanced fourteen engine crankshaft degrees between engine speeds N and 2N, the number of engine crankshaft degrees between points Z1 and Y1, and eight more engine crankshaft degrees between engine speeds 2N to 4N, the number of engine crankshaft degrees between points Y1 and X1. Conversely, at MAP level 3, ignition dwell and ignition spark advance are reduced sixteen engine crankshaft degrees between engine speeds 4N and 2N, respective points X3 and Y3, and fifteen more engine crankshaft degrees between engine speeds 2N and N, respective points Y3 and Z3; at MAP level 2, ignition dwell and ignition spark advance are reduced twelve engine crankshaft degrees between engine speeds 4N and 2N, respective points X2 and Y2, and fifteen more engine crankshaft degrees between engine speeds 2N and N, respective points Y2 and Z2 and at MAP level 1, ignition dwell and ignition spark advance are reduced eight engine crankshaft degrees between engine speeds of 4N and 2N, respective points X1 and Y1, and fourteen more engine crankshaft degrees between engine speeds 2N to N, respective points Y1 and Z1.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. An electronic internal combustion engine ignition spark vacuum and speed advance system comprising in combination with an internal combustion engine and an ignition coil having a primary winding: means for producing in timed relationship with said engine two series of phase displaced leading and trailing electrical signal wave forms of a substantially equal potential level proportional to engine speed; means for producing an engine manifold absolute pressure electrical signal of a potential level proportional to engine manifold absolute pressure; means responsive to said leading electrical signal wave forms and said engine manifold absolute pressure signal for producing an ignition dwell signal while the potential level of each of said leading electrical signal wave forms is greater than that of said engine manifold absolute pressure signal; means responsive to said trailing electrical signal wave forms and said engine manifold absolute pressure signal for producing an ignition signal when the potential level of each of said trailing electrical signal wave forms has increased to that of said engine manifold absolute pressure signal; and circuit means responsive to said dwell time and ignition signals for completing and interrupting, respectively, an energizing circuit for said primary winding of said ignition coil.

2. An electronic internal combustion engine ignition spark vacuum and speed advance system comprising in combination with an internal combustion engine and an ignition coil having a primary winding: means for producing in timed relationship with said engine two series of phase displaced leading and trailing electrical signal wave forms of a substantially equal positive potential level proportional to engine speed; means for producing an engine manifold absolute pressure electrical signal of a positive potential level proportional to engine manifold absolute pressure; means responsive to said leading electrical signal wave forms and said engine manifold absolute pressure signal for producing an ignition dwell signal while the potential level of each of said leading electrical signal wave forms is greater than that of said engine manifold absolute pressure signal; means responsive to said trailing electrical signal wave forms and said engine manifold absolute pressure signal for producing an ignition signal when the potential level of each of said trailing electrical signal wave forms has increased to that of said engine manifold absolute pressure signal; and circuit means responsive to said dwell time and ignition signals for completing and interrupting, respectively, an energizing circuit for said primary winding of said ignition coil.

3. An electronic internal combustion engine ignition spark vacuum and speed advance system comprising in combination with an internal combustion engine and an ignition coil having a primary winding: means for producing in timed relationship with said engine two series of phase displaced leading and trailing electrical signal wave forms of a substantially equal positive potential level proportional to engine speed; means for producing an engine manifold absolute pressure electrical signal of a positive potential level proportional to engine manifold absolute pressure; a first comparator circuit responsive to said leading electrical signal wave forms and said engine manifold absolute pressure signal for producing an ignition dwell signal while the potential level of each of said leading electrical signal wave forms is greater than that of said engine manifold absolute pressure signal; a second comparator circuit responsive to said trailing electrical signal wave forms and said engine manifold absolute pressure signal for producing an ignition signal when the potential level of each of said trailing electrical signal wave forms has increased to that of said engine manifold absolute pressure signal; and an electronic ignition circuit responsive to said dwell time and ignition signals for completing and interrupting, respectively, an energizing circuit for said primary winding of said ignition coil.

4. An electronic internal combustion engine ignition spark vacuum and speed advance system comprising in combination with an internal combustion engine having an intake manifold, an ignition coil having a primary winding and a source of unidirectional potential: means for producing in timed relationship with said engine two series of phase displaced leading and trailing electrical signal wave forms of a substantially equal potential level proportional to engine speed; and absolute pressure transducer in communication with said intake manifold of said engine for producing an engine manifold absolute pressure electrical signal of a potential level proportional to engine manifold absolute pressure; a first electrical potential comparator circuit responsive to said leading electrical signal wave forms and said engine manifold absolute pressure signal for producing an ignition dwell signal while the potential level of each of said leading electrical signal wave forms is greater than that of said engine manifold absolute pressure signal; a second electrical potential comparator circuit responsive to said trailing electrical signal wave forms and said engine manifold absolute pressure signal for producing an ignition signal when the potential level of each of said trailing electrical signal wave forms has increased to that of said engine manifold absolute pressure signal; and circuit means responsive to said dwell time and ignition signals for completing and interrupting, respectively, an energizing circuit for said primary winding of said ignition coil across said source of unidirectional potential.

* * * * *